(12) United States Patent
Asakawa

(10) Patent No.: US 7,930,954 B2
(45) Date of Patent: Apr. 26, 2011

(54) METHOD FOR PRODUCING FORGING DIE, FORGING DIE AND FORGED ARTICLE

(75) Inventor: Jun Asakawa, Kitakata (JP)

(73) Assignee: Showa Denko K.K., Tokyo (JP)

( * ) Notice: Subject to any disclaimer, the term of this patent is extended or adjusted under 35 U.S.C. 154(b) by 1017 days.

(21) Appl. No.: 10/583,041

(22) PCT Filed: Dec. 17, 2004

(86) PCT No.: PCT/JP2004/019464
§ 371 (c)(1),
(2), (4) Date: Mar. 16, 2007

(87) PCT Pub. No.: WO2005/058532
PCT Pub. Date: Jun. 30, 2005

(65) Prior Publication Data
US 2007/0245799 A1      Oct. 25, 2007

Related U.S. Application Data

(60) Provisional application No. 60/534,098, filed on Jan. 5, 2004.

(30) Foreign Application Priority Data

Dec. 17, 2003   (JP) .................. 2003-418939

(51) Int. Cl.
*B23C 3/00*   (2006.01)
*B23C 5/10*   (2006.01)
*B21J 13/02*  (2006.01)

(52) U.S. Cl. ........................................ 76/107.1; 409/132

(58) Field of Classification Search .................. 76/107.1; 409/131, 132
See application file for complete search history.

(56) References Cited

U.S. PATENT DOCUMENTS

| | | | | |
|---|---|---|---|---|
| 3,712,157 | A * | 1/1973 | Kratz et al. | 76/107.1 |
| 3,863,525 | A * | 2/1975 | Cale | 76/107.1 |
| 3,902,381 | A * | 9/1975 | Couchman | 76/107.1 |
| 4,227,396 | A | 10/1980 | Crowe | |
| 4,533,286 | A * | 8/1985 | Kishi et al. | 409/80 |
| 5,087,159 | A * | 2/1992 | Thomas | 409/132 |
| 5,099,723 | A * | 3/1992 | Ziemek | 76/107.1 |
| 5,378,091 | A | 1/1995 | Nakamura | |
| 5,919,012 | A | 7/1999 | Nakagawa et al. | |
| 6,099,216 | A * | 8/2000 | Momochi et al. | 409/132 |
| 6,428,252 | B1 * | 8/2002 | Oldani | 409/132 |
| 7,021,873 | B2 * | 4/2006 | Chihara et al. | 409/132 |
| 7,104,109 | B2 * | 9/2006 | Wasilewski | 72/477 |
| 2010/0143052 | A1 * | 6/2010 | Aoki et al. | 407/54 |

FOREIGN PATENT DOCUMENTS

| JP | 6-134648 A | 5/1994 |
|---|---|---|
| JP | 08-188852 A | 7/1996 |

(Continued)

*Primary Examiner* — Hwei-Siu C Payer
(74) *Attorney, Agent, or Firm* — Sughrue Mion, PLLC

(57) ABSTRACT

A forging die production method comprising a cutting step which employs, as a cutting tool, a ball end mill having a surface which has undergone a hardening treatment and in which a forging die material is cut under conditions where a length of tool extension L (mm), radius R (mm) of a cutting edge of the ball end mill, spindle speed A (rpm) and feed rate B (mm/min) satisfy $(B/A)^2 \times (L/(2 \times R)) = 0.01$ to $0.05$. A forging die is produced through the forging die production method. A forged article is produced through forging by use of the produced forging die.

7 Claims, 7 Drawing Sheets

FOREIGN PATENT DOCUMENTS

| | | |
|---|---|---|
| JP | 8-263122 A | 10/1996 |
| JP | 9-150305 A | 6/1997 |
| JP | 11-170102 A | 6/1999 |
| JP | 2001-105086 A | 4/2001 |
| JP | 2002-154008 A | 5/2002 |
| JP | 2002-239676 A | 8/2002 |
| JP | 2002-292514 A | 10/2002 |
| JP | 2002-307129 A | 10/2002 |
| JP | 2003-225822 A | 8/2003 |
| JP | 2003-268486 A | 9/2003 |
| JP | 2004-74394 * | 3/2004 |
| JP | 2004-188516 * | 7/2004 |

* cited by examiner

HERE,
  $\alpha$ IS DETERMINED WITH REFERENCE TO DIMENSIONAL TOLERANCE OF Ra;
  Ra IS AN ARC OF A CIRCLE TANGENT TO Lv;
  Rb IS AN ARC OF A CIRCLE TANGENT TO Lh AND Ra; AND
  Xb IS AUTOMATICALLY DETERMINED FROM OTHER DIMENSIONS.

HERE,
  α IS DETERMINED WITH REFERENCE TO DIMENSIONAL TOLERANCE OF Ra;
  Ra IS AN ARC OF A CIRCLE TANGENT TO Lv;
  Rb IS AN ARC OF A CIRCLE TANGENT TO Lh AND Ra; AND
  Xa AND Xb ARE AUTOMATICALLY DETERMINED FROM OTHER DIMENSIONS.

METHOD FOR PRODUCING FORGING DIE, FORGING DIE AND FORGED ARTICLE

CROSS REFERENCE TO RELATED APPLICATIONS

This application is an application filed under 35 U.S.C. §111(a) claiming the benefit pursuant to 35 U.S.C. §119(e)(1) of the filing date of Provisional Application No. 60/534,098 filed Jan. 5, 2004 pursuant to 35 U.S.C. §111(b).

TECHNICAL FIELD

The present invention relates to a method for producing a forging die for producing a forging die through use of an aluminum alloy as a raw material; to a forging die; and to forged articles obtained by forging with the forging die.

BACKGROUND ART

Cutting processes involve three fundamental factors: high accuracy, high efficiency, and low cost. Of the three factors, high efficiency is considered to be attained by increasing cutting speed, and therefore, means for such increase has become of interest. With an improvement in cutting speed, cutting efficiency also improves. However, tool life becomes shortened, resulting in increased tool costs. Another problem with the shortened tool life is that increased frequency of tool replacement adversely affects productivity. Thus, realization of highly efficient processing still encounters difficulty.

In particular, since high-precision shaped products have recently been demanded, dies are also required to have high accuracy. Thus, instead of addressing electric discharge techniques which have conventionally been employed, researchers have now focused attention on the direct cutting method for producing dies, as this method is believed to provide high-precision dies at high production rate.

For example, Patent Document 1 (JP-A HEI 11-170102) discloses the following techniques in relation to improved cutting. Namely, the percentage of CBN sintered material contained in a CBN sintered tool is made 75% or more; cutting is performed at a rate of at least 1,500 m/min; a plurality of CBN sintered tools are employed to form a face milling cutter; the cutting speed of the face milling cutter is not less than 1500 m/min.; and cutting is performed with a per-flute feed rate of the CBN sintered tool of 0.2 to 0.4 mm/rev, that is, 0.2 to 0.4 mm per revolution of the face milling cutter. According to Patent Document 1, even when the cutting speed is increased, the above features effectively prevent deterioration of tool life.

Patent Document 2 (JP-A 2003-268486) discloses a hot working tool steel containing 0.28 to 0.55 mass % of C, 0.15 to 0.80 mass % of Si, 0.40 to 0.85 mass % of Mn, not more than 0.020 mass % of P, not more than 0.018 mass % of S, 2.5 to 5.7 mass % of Cr, 1.4 to 2.8 mass % of Mo, 0.20 to 0.90 mass % of V, 0.01 to 1.65 mass % of W, 0.03 to 0.89 mass % of Co, 0.01 to 1.65 mass % of Ni, and the substantial balance of Fe and unavoidable impurities; with the amounts of N, Ti and B contained in the unavoidable impurities being restricted to be 0.009 mass % or less, 0.003 mass % or less and 0.012 mass % or less, respectively, with the cleanliness of nonmetallic inclusions as specified by JIS being dA of 0.005% or less and d(B+C) of 0.020% or less, and with the crystallographic orientation of martensite having undergone heat treatment being 17 to 33%. It further discloses that use of the hot working tool steel can improve machinability, significantly prolong tool life and reduce variation in tool life when the steel material is subjected to a machining process for forming a die through direct cutting and, when subjected to ultrafine cutting, can provide excellent finish surfaces, thereby shortening the time required for lapping.

Also, Patent Document 3 (JP-A HEI 8-188852) discloses a die formed from a material having a composition of 0.25 to 0.45 wt % of C, 0.05 to 0.6 wt % of Si, 0.2 to 0.8 wt % of Mn, 4.0 to 6.0 wt % of Cr, 1.0 to 3.0 wt % of Mo, 0.3 to 1.0 wt % of V, 0.005 to 0.040 wt % of Al, 0.001 to 0.004 wt % of S, and the balance of Fe and unavoidable impurities and having hardness of HRC 41 to 45. Patent Document 3 also discloses that when the die having the above composition is produced through a method including die sinking and plastic forming, in which the material is subjected to die sinking to thereby form a die, and each of the round corner portions of the die-sunk surface of the die is subjected to plastic forming under a pressurizing device having a radius of curvature smaller than the radius of the corner so as to attain a surface plastic forming of a total equivalent strain of 5% or less, the production cost of the die is as low as in the case of producing a conventional hot forging die from a JIS SKT4 or SKD61 steel, and that the die exhibiting excellent durability can be produced under a working environment better than that under which conventional dies are produced.

However, according to the technique described in Patent Document 1, the requirements of 75% or higher CBN sintered material accounting the entire material of the tool and a cutting speed of 1,500 m/min or more are very special conditions which cannot be fulfilled by generally employed machine tools, and in addition, the suggested tool is quite expensive and impractical.

Patent Document 2 discloses investigations on the material, but fails to discuss processing conditions so as to identify specific, optimal conditions.

Patent Document 3 discloses investigations on the material and also discloses a method to impart a compressive stress to a corner portion. However, it fails to disclose specific conditions of the cutting process.

The direct cutting process has the following problems in relation to the cutting conditions. To cope with a variety of shapes, deep milling is required, with a length of tool extension prolonged. Under conventional situations where spindle speed and feed rate are determined on a trial and error basis, when the length of tool extension is increased, optimal conditions cannot be obtained. For example, in usual practice where a spindle speed is set to a maximum possible level, and the feed and the depth of cut (pitch) are calculated on the basis of the required surface roughness, if the calculated feed and depth of cut values are employed as they are, undesirable phenomena, such as chatter of the tool, are caused. In such a case, undesirable phenomena actually occur and correction of the values is needed. Conventionally, reduction of feed rate has usually been recommended for achieving an excellent finish. In reality, in order to determine the conditions under which the best finished surface can be obtained, iterations of trials and errors have been needed, which is time-consuming.

In addition, when a die is produced through conventional direct cutting at high cutting speed, the finish is poor, and therefore, a polishing step is indispensable. The polishing step requires a considerable workload, increasing the die production cost and extending the production time. Moreover, polishing has been a major cause of defects, as it is generally performed by hand. Under such circumstances, research efforts have centered on development of an improved direct cutting process capable of providing a sufficient surface finish level which eliminates or simplifies the polishing step.

The present invention has been conceived in view of the foregoing, and the objects of the invention include provision of a forging die production method which permits high-speed cutting during production of the forging die, ensures tool life, eliminates the need for polishing and thus realizes overall high efficiency in production, provision of a forging die and provision of forged articles produced through forging by use of the forging die.

DISCLOSURE OF THE INVENTION

In order to achieve the above objects, the present invention is directed to a forging die production method comprising a cutting step which employs, as a cutting tool, a ball end mill having a surface which has undergone a hardening treatment and in which a die material is cut under the conditions where the length of tool extension L (mm), radius R (mm) of the cutting edge of the ball end mill, spindle speed A (rpm) and feed rate B (mm/min) satisfy the following equation: $(B/A)^2 \times (L/(2 \times R)) = 0.01$ to $0.05$.

In the above method, the forging die material has a hardness of HRC 45 to 62.

In the first or second mentioned method, cutting oil is directly applied to the cutting tool so that the cutting oil flows in a downward direction during cutting.

In any one of the first to third mentioned methods, the forging die production method includes at least rough cutting, heat treatment, finish cutting and profile cutting; the cutting step is for performing the profile cutting; the profile cutting includes at least three steps wherein the pick feeds in respective steps are in proportions of (1.2 to 2):(0.2 to 0.5):(0.03 to 0.05); and the feed direction includes at least one of the direction in relation to contour line processing and the direction in relation to circulation milling.

In any one of the first to fourth mentioned methods, a corner recess of a workpiece is cut to have a compound curvature.

The present invention is directed also to a forging die produced through any one of the first to fifth mentioned forging die production methods.

The above forging die has a surface roughness Rmax of 5 μm or less and is formed to have a die cavity including a corner recess of a compound curvature.

The present invention is directed also to a forged article produced through forging by use of the first or second mentioned forging die.

According to the present invention, a direct cutting method is employed for producing a forging die, in which a die material is cut under specific conditions under which the length of tool extension, radius of the cutting edge of the ball end mill, spindle speed and feed rate satisfy a predetermined relation. Therefore, optimal working conditions can be easily determined, and high-speed cutting can be realized. Moreover, tool life is ensured, polishing can be eliminated, and thus the invention method enables highly efficient production of a forging die as a whole.

BEST MODE FOR CARRYING OUT THE INVENTION

Modes for carrying out the invention will next be described in more detail with reference to the drawings.

Figure 1:
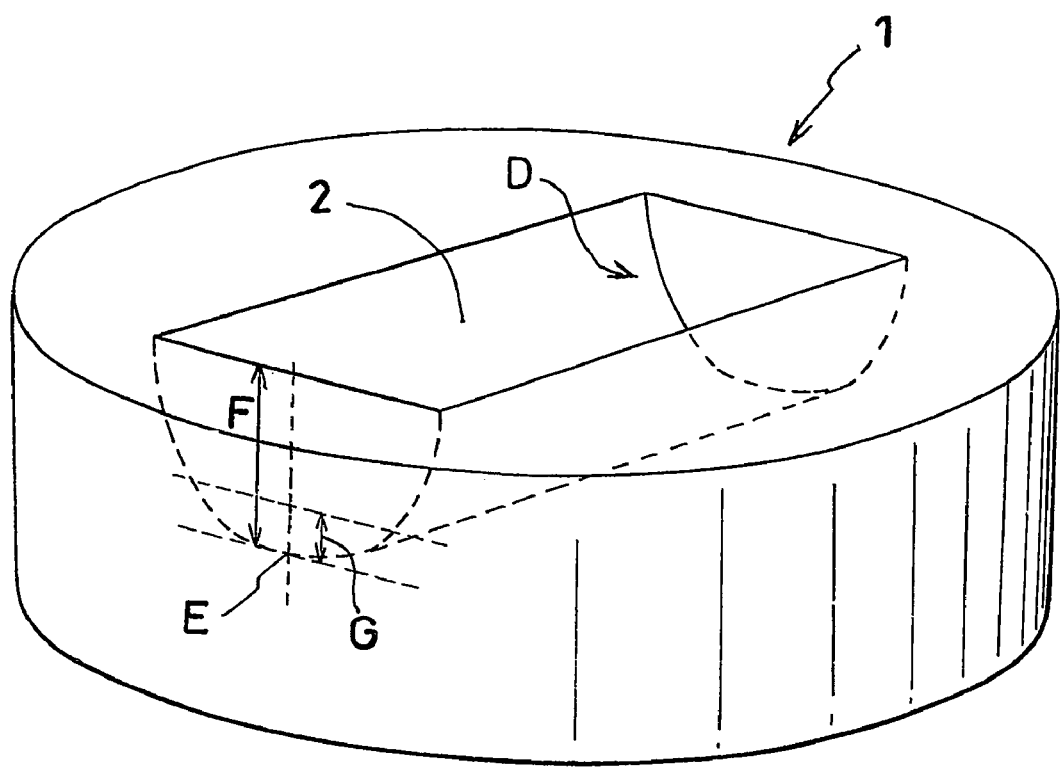
FIG. 1 is a sketch showing an exemplary forging die produced by the method of the present invention.

FIG. 1 depicts a sketch of an exemplary forging die produced by the method of the present invention. A die 1 having a half cylindrical die cavity 2 as shown in FIG. 1 will be described as an example of the forging die to be produced by the present invention. This half cylindrical shape represents a case where the inclination of the surface to be cut changes during processing, and deep cutting is performed.

Firstly, the material of the die 1 is preferably a die steel or high speed tool steel exhibiting an HRC hardness of 45 to 62, preferably 46 to 55 (HRC stands for Rockwell Hardness C). Examples thereof include SKD61 and matrix high speed steel. Through use of such a material, a die having an extended service life and an improved precision can be produced, fully exhibiting the effects of the present invention.

An example production flow for the forging die 1 will next be described. The following production sequence may be performed: (a) rough cutting→(b) heat treatment→(c) finish cutting→(d) profile cutting→(e) polishing→(f) inspection. Next, the respective steps (a) to (f) will be described one by one.

(a) Rough Cutting

Rough cutting is performed by means of a conventional, generally employed technique. For example, by use of a lathe and a milling machine, the outer contour of the die is shaped and index holes are bored. Also, by use of a ball end mill, the half cylindrical die cavity may be formed in advance to an extent of about 80% the entire capacity of the die cavity.

(b) Heat Treatment

Heat treatment is performed for the purpose of adjusting toughness and wear resistance. When SKD 61 is used, preferable heat treatment conditions are as follows: the material is heated at 900 to 1,100° C. (more preferably 1,000 to 1,050° C.) for 30 minutes to one hour, then subjected to rapid cooling, and then retained at 500 to 700° C. (more preferably 560 to 600° C.) for three to five hours. The retention time is modified in consideration of the size of the die.

(c) Finish Cutting

In finish cutting, a lathe is employed to finish the outer contour of the die to size. Portions which are difficult to lathe may be processed through grinding with a grinder, or through wire cut electric discharge machining.

(d) Profile Cutting

A ball end mill having a surface that has undergone a hardening treatment is employed as a cutting tool to thereby finish the die cavity of the die to final shape. The profile cutting preferably includes a plurality of steps; for example, at least three cutting steps, and fulfils the cutting conditions which will be described herein below. In addition, the feed direction preferably comprises contour line processing and/or circumference processing.

Figure 2:
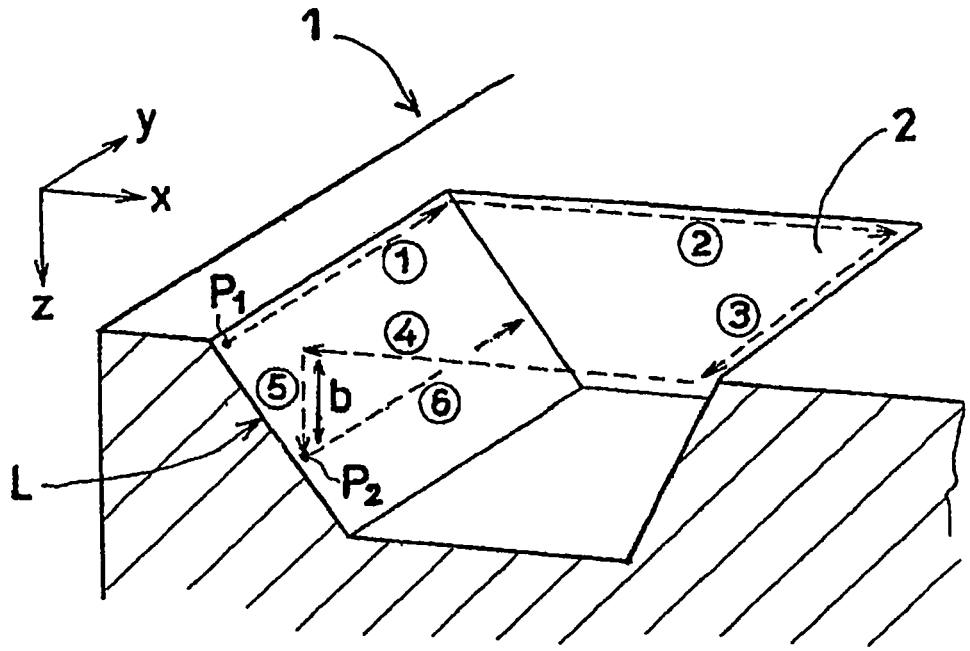
FIG. 2 is an illustration for explaining the contour processing.
Figure 3:
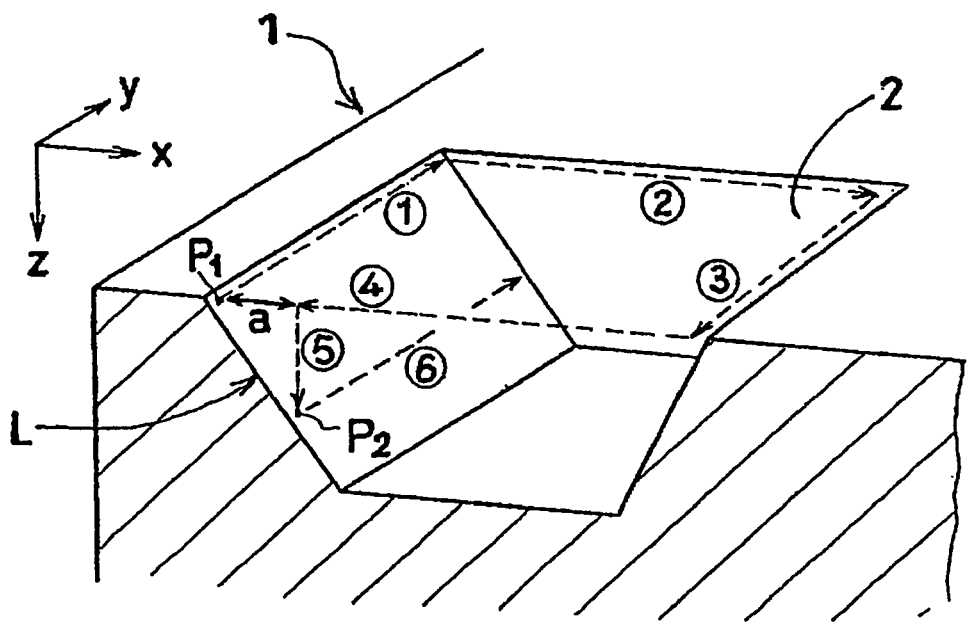
FIG. 3 is an illustration for explaining the circumference processing.

FIG. 2 and FIG. 3 are illustrations for explaining the contour line processing and circumference processing, respectively. These drawings depict the progress of cutting processes for obtaining a die cavity 2 having a final shape. Notably, the cutting edge of a tool starts at point P1 (x1, y1, z1) to proceed via (1)→(2)→(3)→(4), and when the cutting edge moves to point P2 (x2, y2, z2), two options are available in (5), depending on whether contour line processing or circumference processing is employed.

In the contour line processing shown in FIG. 2, firstly at (5), the difference "b" between the Z-axis coordinate z2 of point P2 and the Z-axis coordinate z1 of point P1 is given to determine the Z-axis coordinate. Then, the X-axis coordinate x2 of P2 is calculated on line L so as to correspond to the Z-axis coordinate z2, whereby (x2, y2, z2), representing point P2, is determined. Thus, the process proceeds to the point P2 having the above coordinates, and further moves along (6). The contour line processing is applied to a standing wall and gradually proceeds in a downward, or, conversely, upward, direction at a predetermined pick feed (pitch) in the Z-axis direction (i.e., depth direction). Therefore, an advantage of the contour line processing is that it enables efficient processing of an object having an undulating shape.

In contrast, according to the circumference processing as shown in FIG. 3, firstly at (5), the difference "a" between the X-axis coordinate x2 of point P2 and the X-axis coordinate x1 of point P1 is given to determine the X-axis coordinate. Then, the Z-axis coordinate z2 of P2 is calculated on line L so as to correspond to the X-axis coordinate x2, whereby (x2, y2, z2), representing point P2, is determined. Thus, the process proceeds to the point P2 having the above coordinates, and further moves along (6) The circumference processing is applied to a quasi-flat shape and proceeds in an inward, or, conversely, outward, direction at a predetermined pick feed (pitch) in the XY-plane (i.e., horizontal direction). Therefore, an advantage of the circumference processing is that it enables efficient processing of an object having gentle slopes.

When an object having an intricate shape is processed, preferably, the contour line processing and the circumference processing are used in combination. For example, portions having nearly upright walls may be neatly processed through the contour line processing which advances at a predetermined Z-direction pick feed. However, at portions having nearly flat surfaces, the pick feed is lengthened (in other words, roughened). Therefore, in order to compensate for this problem, employment of the circumference processing is recommended for portions having nearly flat surfaces.

When a half cylindrical shape, which represents an exemplary shape showing changing inclination angle of the surface to be processed, is desired to be engraved, preferably, the upper section which is of shallow depth is processed with the contour line processing, and the lower section which is of deep depth is processed with the circumference processing. In view of realization of approximately equal pick feeds of the two types of processing, switchover thereof preferably takes place at a position at which the angle between the tangent surface of the half cylindrical die cavity and the horizontal surface becomes 30 to 50°. Also, a 0.1 to 1 mm overlap of the two types of processing is preferred for preventing portions from being left unprocessed at switchover border regions.

Profile cutting is a so-called direct cutting. Depending on the profile to be processed, a smaller cutting tool (having a tool radius R of 0.2 to 1 mm, preferably 0.5 mm) may be employed to remove any minute "left-over" portions.

(e) Polishing Processing

Polishing processing is performed according to needs, when roughness of the surface after undergoing processing is desired to be improved to higher quality. For example, surfaces may be ground through use of a grinding stone, and subsequently, diamond paste is applied thereto and the surfaces are polished using a felt buff or a wooden piece. Polishing processing may be omitted, depending on the conditions of the workpiece which has undergone profile cutting.

(f) Inspection

Lastly, the finished workpiece is inspected. The inspection items include dimensional inspection by means of a three-dimensional measuring apparatus, vernier calipers, or a gauge; dimensional inspection by means of a profile measuring apparatus; hardness inspection by means of a hardness tester; and surface roughness inspection by means of a surface roughness measurement instrument.

Next, the workpiece cutting process according to the present invention will be described. First, the tools employed for the workpiece cutting process of the present invention are described.

Figure 4:
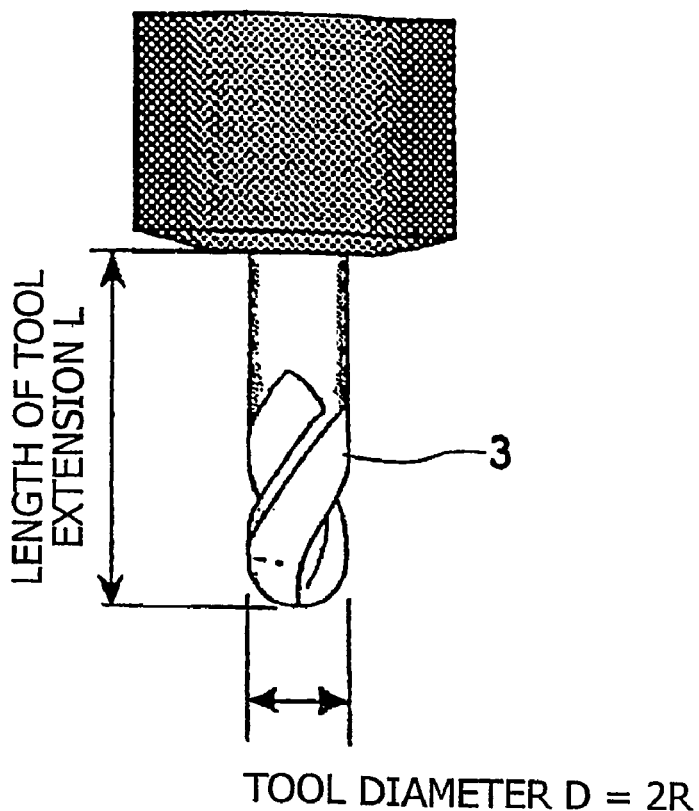
FIG. 4 is an exemplary tool employable in the present invention.

FIG. 4 shows an example of the tool which is employed in the present invention. No particular limitation is imposed on the tool 3 to be used in the present invention, so long as it has a surface which had undergone a hardening treatment (surface hardening treatment). For example, a hardening layer is applied to a matrix surface. The material for the hardening layer includes TiAlN (titanium aluminum nitride), TiSiN (titanium silicon nitride) and CrSiN (chromium silicon nitride), for example. In particular, from the viewpoint of tool life, materials exhibiting a low coefficient of friction with respect to the die material and having a high oxidation starting temperature of the hardness-imparting coating are preferred.

The shape of the cutting edge of the tool 3 preferably resembles that of a ball end mill and has a (core diameter)/(outer diameter) ratio of 0.6 to 0.8, from the viewpoint of improvement in tool rigidity. No particular limitations are imposed on the number of flutes, and a tool having two to three flutes may be employed.

In order to facilitate deep machining, preferably the tool diameter D (=2R) is 0.4 to 10 mm, preferably 0.5 to 6 mm, and the preferable length of tool extension L is 5 to 20 mm (more preferably 5 to 17 mm).

Moreover, in order to implement engraving of a minute profile, the tool diameter D (2R) is preferably 0.2 to 2 mm (more preferably 0.4 to 2 mm).

In particular, tools satisfying the relation L/2R (=L/D)=3 to 20 (preferably 3.5 to 15) are advantageous, since they better provide the effects of the present invention.

The finish of the machined surfaces is affected by runout of a cutting tool during cutting. For this, the runout of a cutting tool is preferably suppressed to a level of 5 μm or less when the cutting tool races (when the cutting tool in an attached state is rotated without performing processing). To this end, different approaches may be implemented, including, for example, use of a device permitting minimal (for example, 2 μm or less) runout of the rotary spindle; use of a two-surface-restriction type collet holder for mounting the cutting tool onto the machine tool spindle; shrink fitting of a collet chuck for holding the cutting edge; and arbitrary combinations of any of these.

Next, cutting conditions will be described.

According to the present invention, cutting is performed under the conditions where the length of tool extension L (mm), radius R (mm) of the cutting edge of the ball end mill, spindle speed A (rpm) and feed rate B (mm/min.) satisfy $(B/A)^2 \times (L/(2 \times R)) = 0.01$ to $0.05$.

Hitherto, spindle speed and feed rate were determined on a trial and error basis, and when the length of tool extension was increased so as to facilitate deep engraving, optimal conditions could not be obtained.

While the spindle speed is set as high as possible, the feed and the depth of cut (pitch) can be calculated on the basis of the required surface roughness. However, if the calculated feed and depth-of-cut values are employed as they are, undesirable phenomena, such as chatter of the tool, are caused. In such a case, undesirable phenomena actually occur and correction of the values is needed. Conventionally, reduction of feed rate has usually been recommended for achieving an excellent finish. In reality, however, in order to determine the conditions under which the best finished surface can be obtained, iterations of trials and errors have been needed, which is time-consuming.

The present inventor has found that too low a feed rate adversely affects the state of the finished surface and that this has made it difficult to identify parameters realizing the optimal conditions. The inventors have concluded that this problem can be satisfactorily avoided through control of the value of $(B/A)^2 \times (L/(2 \times R))$.

Figure 5:
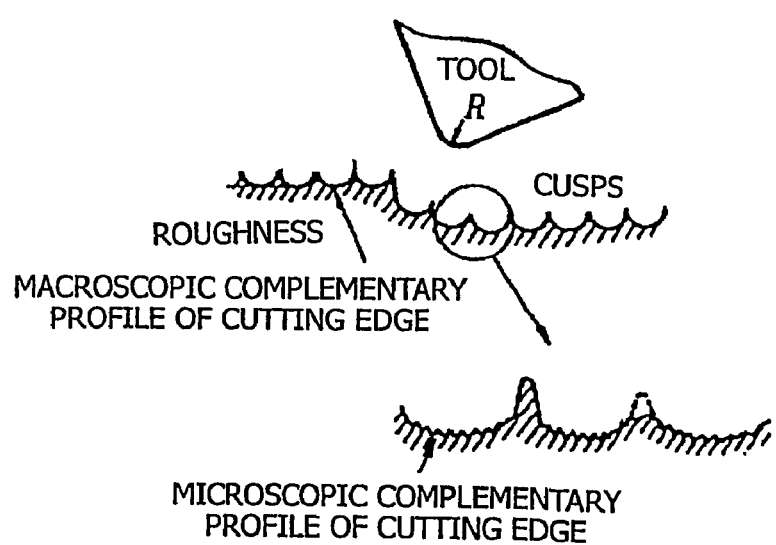
FIG. 5 is a conceptual illustration for explaining cutting conditions.

A conceivable mechanism is as follows. When the surface of a workpiece after cutting is inspected, as shown in FIG. 5, a macroscopic complementary profile of the cutting edge and a microscopic complementary profile of the cutting edge are observed, and conditions of these profiles are closely related to the quality of the finished surface.

When the feed rate becomes excessively large in relation to the spindle speed, defect marks tend to be left due to the occurrence of biting of the cutting tool, which is considered to correspond to the macroscopic complementary profile of the cutting edge, and minute chipping is generated when the cutting edge collides with the cusps.

In contrast, when the feed rate becomes excessively small in relation to the spindle speed, very minute scratch marks, which are considered to correspond to the microscopic complementary profile of the cutting edge, tend to remain. In particular, after the tool has been in actual use for a prolonged period of time, scratch marks come to be generated easily.

Therefore, in determining cutting conditions, balancing of the above factors must be taken into consideration. However, consideration of the ratio of spindle speed to feed rate alone is insufficient, and it has now been clarified that the radius of the cutting edge of the tool and L/2R are also critical.

The present inventors have focused their attention on a value of $(B/A)^2$ which is associated with the kinetic energy of the tool and a value of $(L/2R)$ which is a tool parameter. Thus, successful control is now possible in cases where the tool radius is small or in cases where L/2R is large.

Therefore, since a forging die material is now processed through cutting under conditions under which the length of tool extension, radius of the cutting edge of the ball end mill, spindle speed and feed rate satisfy a predetermined relation, optimal working conditions can be easily determined, excellent surface finish can be attained, and high-speed cutting can be realized. Particularly when the length of tool extension is increased and deep engraving is performed, satisfactory surfaces can be obtained. Moreover, since consistent cutting conditions are attained, with chatter of the tool being prevented, not only can the tool life be prolonged, but also a polishing step can be omitted. Thus, the invention enables highly efficient production of a forging die as a whole.

Preferably, the feed rate is modified in accordance with the surface profile of the workpiece. Specifically, if the advancing direction of the tool is changed in an amount of 35° to 45° or more at a corner portion, the feed rate is preferably reduced by 30 to 40% when the cutting edge has reached a point 0.2 to 0.5 mm before the point of change.

The profile cutting preferably includes at least three cutting steps, and the feed direction of the tool preferably comprises contour line processing and/or circumference processing. In this case, the pick feeds (i.e., pitch in the radius direction of the tool) in respective steps are preferably in proportions of (1.2 to 2):(0.2 to 0.5):(0.03 to 0.05). When these proportions are met, uneven finish of the machined surface, which may otherwise result in the third step, can be prevented because through cutting in the second step, uneven removal stock remaining throughout the surfaces is leveled to 10 to 30 μm or less, and then the cutting in the third step is performed; or, stated differently, because through cutting in the second step, uneven removal stock remaining throughout the surfaces is leveled to 20 to 80% the final stock allowance, and then the cutting in the third step is performed. As a result, the stock allowance in the third step, which is performed for the purpose of improving finishing accuracy, can be made uniform, and thus cutting can be consistently performed in the third step, and dimensional accuracy in terms of die design can be improved.

Particularly when a die having a half cylindrical die cavity is produced, in the second, third and any subsequent steps, preferably, contour line processing and circumference processing are used in combination.

Figure 6:
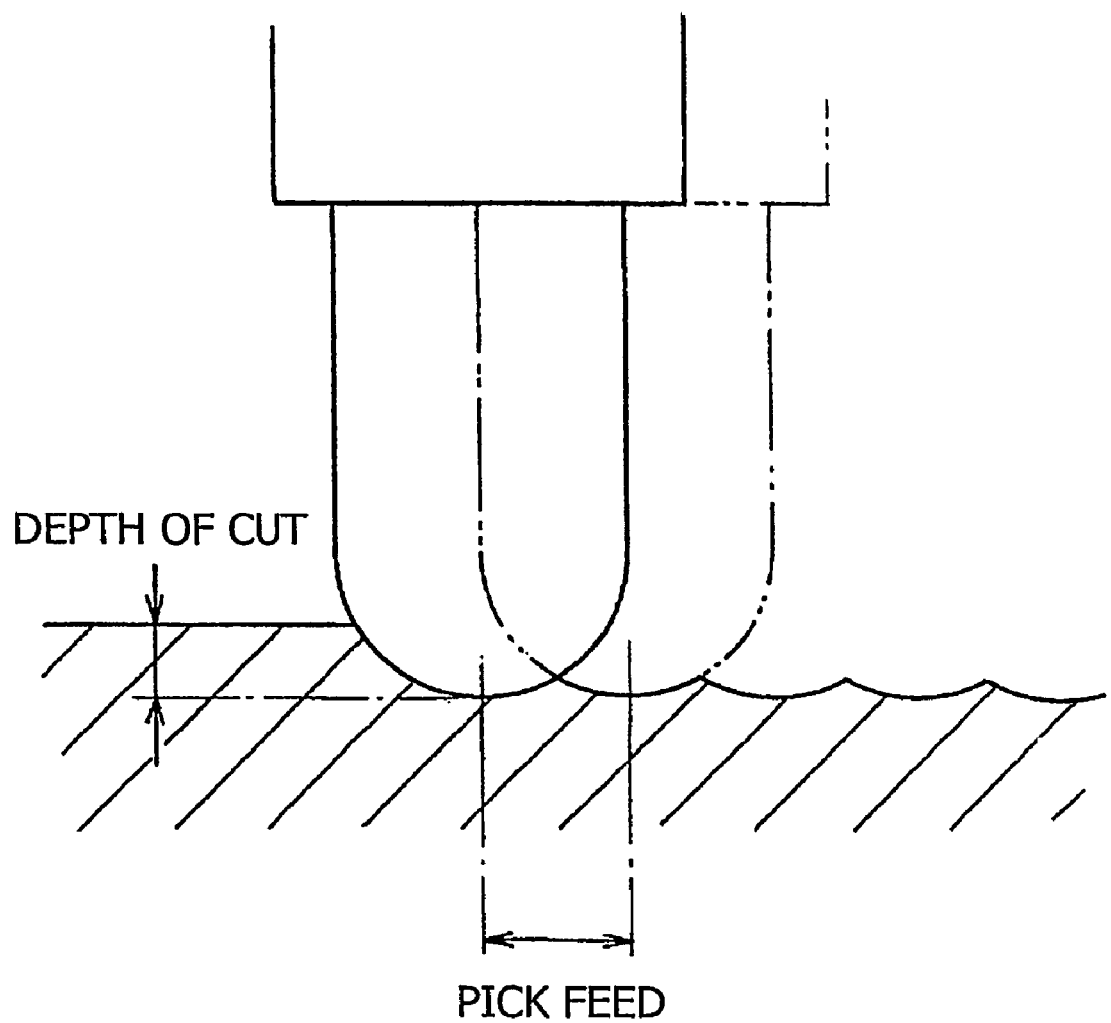
FIG. 6 is a conceptual illustration for explaining a cutting process.

An exemplary cutting operation may be performed under the following conditions: in the first step, contour line processing is performed with a pick feed of 1.5 to 2.2 mm, preferably 1.8 mm, and a depth of cut of 0.15 to 0.25 mm, preferably 0.2 mm; in the second step, contour line processing and circumference processing are employed in combination, with a pick feed of 0.3 to 0.5 mm, preferably 0.4 mm, and a depth of cut of 0.3 to 0.5 mm, preferably 0.4 mm; and in the third step, contour line processing and circumference processing are employed in combination, with a pick feed of 0.04 to 0.06 mm, preferably 0.05 mm, and a depth of cut of 0.04 to 0.06 mm, preferably 0.05 mm. The relation between pick feed and depth of cut is shown in FIG. 6.

As cutting oil (lubricant), water-insoluble cutting oil may be employed. For example, a carbon steel cutting oil or an alloy steel cutting oil in the class of sulfurized fatty oils may be used. Preferably, the temperature at which the cutting oil is supplied is 15° C. to 30° C. Next, preferred cutting oil flow modes according to the present invention will be described. The flow rate is preferably 15 to 25 liters/min.

When a conventional air-blow mode is employed, although chips can be blown off to some extent, the cooling capacity is insufficient.

According to a conventional mist jet mode, water-insoluble cutting oil is converted to a mist and the mist is sprayed onto the cutting edge together with the air. The supply rate may be, for example, 0.2 liter/min for mist and 200 liters/min for air. With this method, since the number of jet nozzles is typically only one, when the mist jet is blocked by the workpiece to thereby become unable to reach the tip end of the cutting edge, the effect of the cutting oil mist is reduced or cannot be obtained at all.

According to a preferred cutting oil flow mode of the present invention, the oil is jetted from at least two directions, so that a tip end portion of at least 5 mm as measured from the tip point of the cutting edge is maintained to always be immersed in the cutting oil. With this mode, even when the cutting tool comes behind the workpiece, the tip end of the tool is always immersed in the cutting oil, and therefore, the effect of the cutting oil can always be enjoyed. Since according to the present invention the spindle speed of the tool is high, this flow-down mode is advantageous in that it provides a sufficient cooling effect, leading to an extended tool life.

Preferably, the cutting oil is supplied downward from above the cutting edge. In particular, supply of the cutting oil in all directions centering the tool is preferred in that insufficient supply of cutting oil can be prevented when standing-wall-like portions are machined. Specifically, cutting oil jet nozzles may be provided around the tool, with their nozzle ends facing the tool.

When conditions of generated chips are inappropriate, they tend to adhere to the tool to impede the performance of the tool, or permit quick wear of the tool to shorten the service life of the tool. Moreover, they tend to increase cutting resistance to thereby slow the cutting speed or accelerate wear of the tool. Specifically, inadequate discharge of chips causes chatter of the tool, which may lead to lowering in quality of the finished surface or accelerated deterioration of the tool. The present invention satisfactorily addresses these problems by flow-down supply of cutting oil, achieving effective discharge of chips. Smooth removal of chips prevents adherence of chips to the tool, generation of defects and chatter of the tool to thereby stabilize cutting conditions.

Next will be described the compound curvature. The compound curvature is defined in relation to the concavity of a corner formed of straight line portions and a curved portion, and represents a profile composed of, in addition to a predetermined radius (R1) of the corner, at least one curve having a radius (R2) of curvature of more than once and 4 times or less, preferably 1.5 to 2.5 times, R1 being added to the transient portion between the curved portion and a straight portion. The compound curvature presents a profile capable of preventing sharp changes in contact area of the tool. In the case where a draft angle is added to a standing wall portion, this may be considered to play a role similar to that of the compound curvature.

Figure 7:
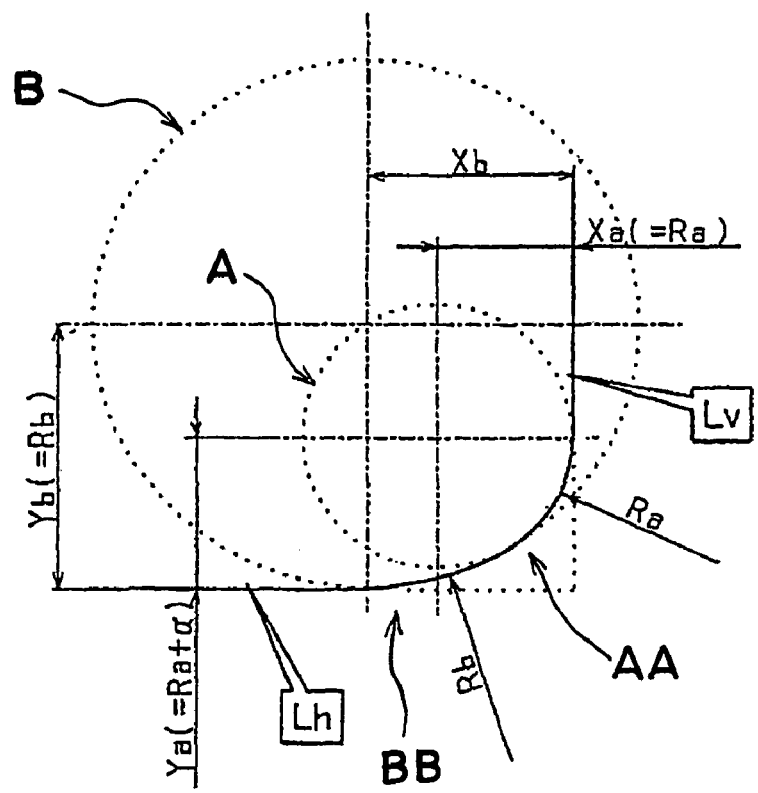
FIG. 7 is a diagram showing a corner recess with a compound curvature.
Figure 8:
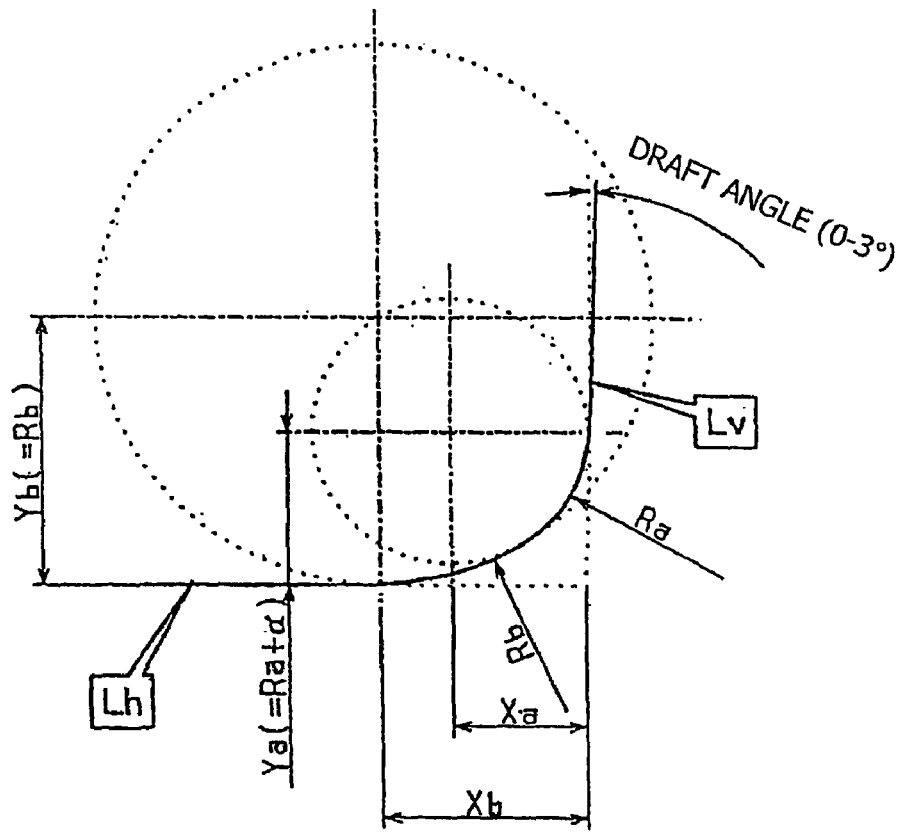
FIG. 8 is another diagram showing a corner recess with a compound curvature.
Figure 9:
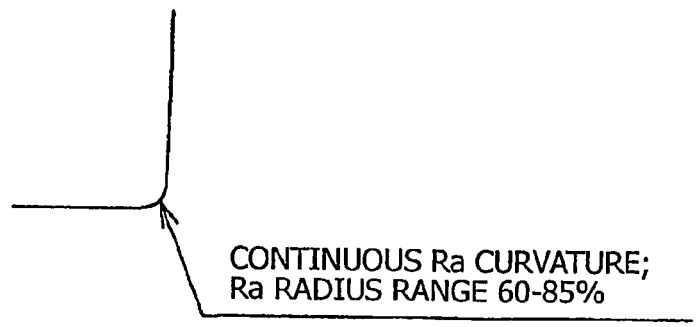
FIG. 9 is another diagram showing a corner recess with a compound curvature.

FIGS. 7, 8 and 9 are cross sections showing corner recess profiles having a compound curvature. The corner recess profile having a compound curvature, shown in FIG. 7, can be set through the following:

(1) Lv and Lh are determined, as cross-sectional contour shapes of the wall surfaces defining the corner, from the shape of a forged product.
(2) Ra is determined from a shape required for the corner of a forged product. For example, it can be a radius of curvature of the corner of a given forged product.
(3) A compound curvature index a is given. It may be 0.5Ra or less. For example, it can be defined by (a tolerance value of the corner shape of a forged product)×(0.5 to 2).
(4) An imaginary circle (A) is drawn, with a point (Xa (=Ra), Ya=(Ra+α)) as the center that is the position of the length Ra from Lv and the position of the length Ra+α from Lh.
(5) An imaginary circle (B) contacting both the imaginary circle (A) and Lh is obtained. The imaginary circle (B) can be obtained under the conditions of the contact with the two through either numerical calculation or drawing figures. When obtaining a plurality of solutions, any one solution of 4 times or less the Ra is selected.
(6) The relation between the imaginary circles (A) and (B) is that the imaginary circle (A) is inscribed in the imaginary circle (B). This is one of the characteristics of the compound curvature.
(7) The center of the imaginary circle (B) contacting the imaginary circle (A) is a point (Xb=(Rb−β), Yb=(Rb)) that is the position of the length Rb from Lh, and the radius thereof is Rb, in which Rb and β are constants obtained from the contacting condition in item (5) above.
(8) A circular arc (BB) of a radius of Ra that contacts both the imaginary circle (A) and the Lh is drawn, with a point (Xb, Yb) as the center.
(9) A circular arc (AA) of a radius of Ra contacting both the circular arc (BB) and the Lv is described, with a point (Xa, Ya) as the center.
(10) The Lv, circular arc (AA), circular arc (BB) and Lh are connected to determine a corner recess profile having a compound curvature.

In FIGS. 7 and 8, α is determined using the dimensional tolerance of Ra as a criterion, Ra is a circular arc in contact with Lv, Rb is a circular arc in contact with Lh and Ra, and Xa and Xb are dimensions automatically determined from the dimensions of the cited elements. In FIG. 7, the corner recess is formed of straight line portions Lh and Lv, a curved portion having a predetermined radius of curvature Ra and another curved portion having a radius of curvature Rb, which portions are connected to present a somewhat multi-step shape. While Rb is provided in contact with Ra and Lh in FIG. 7, it may be provided in contact with Ra and Lv. When it is intended to obtain a corner recess profile having a further compounded curvature, this can be attained through addition of another imaginary circle between the imaginary circles (A) and (B). For example, an imaginary circle (C) of a radius of Rc contacting the imaginary circle (A) is described, with a point (Rc, Rc+αc) as the center, wherein αc=mαa and Rc=nRa in which αa is α of the imaginary circle (A), m is a value less than 1, that is 0.5, for example, and n is a value more than 1, that is 2, for example. A corner recess profile having a further compounded curvature can be obtained based on the imaginary circles (A), (B) and (C), provided that the imaginary circle (B) is disposed between the imaginary circle (C) and the Lv.

FIG. 8 shows a case where a draft angle is provided. Like the case of FIG. 7, the corner recess is formed of straight line portions Lh and Lv, a curved portion having a predetermined radius of curvature Ra and another curved portion having a radius of curvature Rb, which portions are connected to present a somewhat multi-step shape. While Rb is provided in contact with Ra and Lh in FIG. 8, it may be provided in contact with Ra and Lv. This profile is preferred in that, at standing wall portions, contact of the tool can be prevented with ease.

FIG. 9 shows a situation where the corner recess includes a curved segment having a predetermined radius of curvature R and covering 60% to 85% the corner recess, with the center of coverage coinciding with the corner center, and the remaining portions that are formed of curved segments having continuously changing radii of curvature. Thus, this situation is directed to an example of compound curvature having continuously changing radii of curvature.

Figure 10:
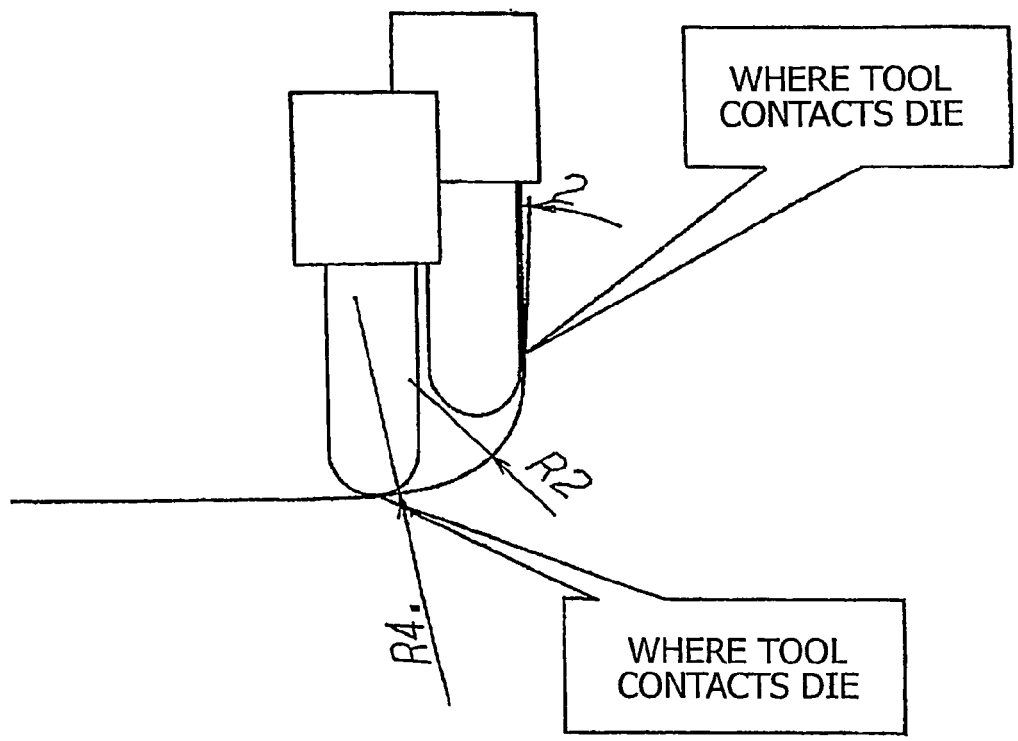
FIG. 10 is a conceptual illustration showing cutting conditions at a corner portion.

Thus, as shown in FIG. 10 for example, when the tool 3 contacts (collides on) the surface to be processed, the provision of a compound curvature at the corner recess prevents abrupt change in contact area between the tool and the surface that undergoes processing. Therefore, consistent feed of the tool can be attained to thereby prevent occurrence of chatter, leading to a better finish. Corner recesses have hitherto been difficult to polish uniformly because of the nature of their profile, and thus have long raised a problem in manufacture. Provision of a compound curvature is advantageous in that polishing can be omitted or simplified. Moreover, since the presence of a compound curvature reduces the contact area between the die and the cutting tool, generated chips are small in size, and more space can be provided for discharging the chips. As a result, chip discharge conditions are improved, and chances of reentry of once-discharged chips between the cutting edge and the workpiece are successfully reduced.

In the case of a corner recess having inclination angle varied, i.e. the corner recess shown in FIG. 1, for example, the corner recess profile D is a surface inclined in a tangential direction of a half cylindrical shape. Preferably, the corner recess includes a compound curvature at a lower part G occupying at least 20% the length F from the lowermost part E to the uppermost part. The conditions of contact of a cutting tool with a workpiece at that part G affect the finish conditions (surface profile, surface roughness and dimensional accuracy) of the workpiece.

In the profile cutting step, in order to perform direct cutting, a machining center may be employed. A machining center is a type of numerically controlled machine tool. It includes a main rotating tool and an automatic tool exchanger, thereby enabling multiple types of processing without changing the program for tool exchange. In particular, a machining center used for performing direct cutting desirably has a spindle rotation speed of 20,000 or more.

The die profile is designed primarily on three-dimensional CAD. On the basis of the designed profile model, the number of processing stages, types of cutters to be used in respective stages, pick feed, depth of cut and pitch are determined, whereby a tool trajectory (manner of processing) is calculated through CAM and output as NC data. The obtained NC data are transferred to a machining center via LAN cables, etc., and then the machining center carries out cutting on the basis of the NC data.

Cutting conditions, procedures for performing profile cutting, etc. of the present invention are supplied to CAM as prerequisites. The profile of a compound curvature is designed using CAD.

The die cavity of a forging die which is produced through the above-described production method has a surface roughness Rmax of 5 μm or less (preferably 3 μm or less), and has a compound curvature at a corner recess. The forging die can be produced in a short time and the surface finish is beautiful. When articles are fabricated through forging with such a forging die, the articles are excellent in surface finish, and in particular, surface finish of corner portions is remarkably excellent.

Forging techniques employable with the above-described die are existing ones including cold forging and warm forging. An example in which an aluminum alloy serves as a forging material will next be described.

The above-described die is installed in a forging apparatus so as to serve as a lower die. When necessary, the die is thermally fit into a mother die. The forging material is prepared by cutting an extruded material or a continuously cast rod to have a predetermined size. The forging material is subjected to a lubrication treatment and then placed in the die. According to needs, the forging material and the die are heated in advance. An upper die is caused to descend to thereby perform forging. In the case of forging with flash, trimming for removing flash is further performed. The forged article is subjected to heat treatment according to needs. Although the above description is given in relation to a lower die, the die of the present invention may be used as an upper die which conforms to the shape of the article to be manufactured. Alternatively, both the upper and lower dies may be the dies of the present invention.

The resultant articles forged with the above-described die have excellently finished surfaces, clearly reflecting the surface profiles of the die. Specifically, corner portions show excellently finished surface conditions. For example, since the die is not divided at a corner portion, no flash is generated. Also, in the case where a die having a compound curvature is employed, a smoothly curved surface is obtained for a convexity corner and thus the appearance is excellent.

EXAMPLES

The present invention will next be described in detail by way of examples, which should not be construed as limiting the invention thereto.

The die material employed is SKD 61 having HRC hardness of 48±2. The tool employed is a ball end mill of R0.5 to R2. The surface coating is CrSiN. Other conditions are shown in Tables 1 and 2.

The surface finish conditions after the material underwent cutting were observed under a magnifying lens and evaluated. The results of evaluation are shown in Table 1. Table 2 shows results of comparison between a conventional method and the present invention.

TABLE 1

| SAMPLE NO. | TOOL RADIUS (R) (mm) | LENGTH OF TOOL EXTENSION (L) (mm) | L/2R | ROTATION (A) (rpm) | FEED (B) (mm/MIN) | (B/A) | $(B/A)^2 \times$ (L/2R) | SURFACE ROUGHNESS CONDITIONS |
|---|---|---|---|---|---|---|---|---|
| COMP. EX. 1 | 2 | 15 | 3.75 | 20000 | 3600 | 0.180 | 0.122 | x INSERTION MARKS |
| EX. 1 | 2 | 15 | 3.75 | 20000 | 2000 | 0.100 | 0.038 | ○ |
| EX. 2 | 2 | 15 | 3.75 | 20000 | 1200 | 0.060 | 0.014 | ○ |
| COMP. EX. 2 | 2 | 15 | 3.75 | 20000 | 900 | 0.045 | 0.008 | x SCRATCH MARKS |
| COMP. EX. 3 | 2 | 15 | 3.75 | 20000 | 700 | 0.035 | 0.005 | x SCRATCH MARKS |
| COMP. EX. 4 | 2 | 15 | 3.75 | 40000 | 5000 | 0.125 | 0.059 | x INSERTION MARKS |
| EX. 3 | 2 | 15 | 3.75 | 40000 | 2400 | 0.060 | 0.014 | ○ |
| COMP. EX. 5 | 2 | 15 | 3.75 | 40000 | 1200 | 0.030 | 0.003 | x SCRATCH MARKS |
| COMP. EX. 6 | 2 | 15 | 3.75 | 15000 | 1800 | 0.120 | 0.054 | x INSERTION MARKS |
| EX. 4 | 2 | 15 | 3.75 | 15000 | 1000 | 0.067 | 0.017 | ○ |
| COMP. EX. 7 | 2 | 15 | 3.75 | 15000 | 700 | 0.047 | 0.008 | x SCRATCH MARKS |
| COMP. EX. 8 | 1 | 15 | 7.5 | 20000 | 1800 | 0.090 | 0.061 | x INSERTION MARKS |
| EX. 5 | 1 | 15 | 7.5 | 20000 | 800 | 0.040 | 0.012 | ○ |
| EX. 6 | 1 | 15 | 7.5 | 20000 | 1600 | 0.080 | 0.048 | ○ |
| COMP. EX. 9 | 1 | 15 | 7.5 | 20000 | 600 | 0.030 | 0.007 | x SCRATCH MARKS |
| COMP. EX. 10 | 0.5 | 15 | 15 | 20000 | 1500 | 0.075 | 0.084 | x INSERTION MARKS |
| EX. 7 | 0.5 | 15 | 15 | 20000 | 800 | 0.040 | 0.024 | ○ |
| COMP. EX. 11 | 0.5 | 15 | 15 | 20000 | 450 | 0.023 | 0.008 | x SCRATCH MARKS |

TABLE 2

| | COMPARATIVE EXAMPLE | PRESENT INVENTION |
|---|---|---|
| PROCESSING FLUID | AIR BLOW | CUTTING OIL, FLOW-DOWN |
| PROCESSING SPEED | 3,600 mm/min | 1,200 mm/min |
| PROCESSING PITCH | 0.08 mm | 0.05 mm |
| PROCESSING METHOD | 2-STEP CUTTING | 3-STEP CUTTING (PITCH RATIO = 1.5:0..3:0.04) |
| CORNER R | PREDETERMINED R ONLY | MULTI-STEP COMPOUND CURVATURE |
| FINISHED DIE DIMENSIONAL ACCURACY | WITHIN DESIGN VALUE ± 0.05 mm | WITHIN DESIGN VALUE ± 0.02 mm |
| SURFACE ROUGHNESS | Rmax 7 μm | Rmax 2 μm |
| TOOL LIFE | 4 DIES/TOOL | 10 DIES/TOOL |

INDUSTRIAL APPLICABILITY

As is clear from Table 1, it is possible to efficiently produce forging dies having good finish surfaces through appropriate selection of the spindle speed (A rpm) and feed rate (B mm/min) to satisfy $(B/A)^2 \times (L/2R) = 0.01$ to 0.05 even when the tool diameter (2R mm) and the length of tool extension (L mm) are the same.

The invention claimed is:

1. A forging die production method comprising:
   providing a ball end mill having a surface which has undergone a hardening treatment;
   providing a forging die material to be cut by the ball mill end; and
   cutting the forging die material by controlling the ball end mill so that a length of tool extension L (mm), radius R (mm) of a cutting edge of the ball end mill, spindle speed A (rpm) and feed rate B (mm/min) satisfy $(B/A)^2 \times (L/(2 \times R)) = 0.01$ to 0.05, and
   wherein the forging die production method includes at least rough cutting, heat treatment, finish cutting and profile cutting, the cutting step is for performing the profile cutting, the profile cutting includes at least three steps wherein pick feeds in respective steps are in proportions of (1.2 to 2):(0.2 to 0.5):(0.03 to 0.05), and a feed direction includes at least one of a direction in relation to contour line processing and a direction in relation to circulation milling.

2. A forging die production method according to claim 1, wherein the method further comprises selecting as the forging die material to be cut a material having a Rockwell C hardness of 45 to 62.

3. A forging die production method according to claim 1, wherein cutting oil is directly applied to the cutting tool so that the cutting oil flows in a downward direction during cutting.

4. A forging die production method according to claim 1, wherein the forging die material is cut to have a compound curvature in a corner recess through the cutting step.

5. A forging die production method according to claim 4, wherein the method further comprises selecting as the forging die material to be cut a material having a Rockwell C hardness of 45 to 62.

6. A forging die production method according to claim 4, wherein cutting oil is directly applied to the cutting tool so that the cutting oil flows in a downward direction during cutting.

7. A forging die produced through the forging die production method according to claim 1, wherein the forging die has a surface roughness Rmax of 5 μm or less and is formed to have a die cavity including a corner recess of a compound curvature.

* * * * *